(12) United States Patent
Arosio

(10) Patent No.: US 6,814,340 B2
(45) Date of Patent: Nov. 9, 2004

(54) QUICK-ACTION COUPLING OF A FLAT DESIGN

(75) Inventor: Massimo Arosio, Rivolta d'Adda (IT)

(73) Assignee: Faster S.R.L., Rivolta d'Adda (IT)

( * ) Notice: Subject to any disclaimer, the term of this patent is extended or adjusted under 35 U.S.C. 154(b) by 117 days.

(21) Appl. No.: 10/187,101

(22) Filed: Jul. 1, 2002

(65) Prior Publication Data
US 2003/0006392 A1 Jan. 9, 2003

(30) Foreign Application Priority Data
Jul. 4, 2001 (IT) .................................. MI2001A1415

(51) Int. Cl.⁷ .................... F16K 51/00; F16L 29/00; F16L 37/28
(52) U.S. Cl. .................. 251/149.1; 251/149.6; 137/614.02; 137/614.05
(58) Field of Search .............. 137/614.02, 614.03, 137/614.05; 251/142, 149.1, 149.3, 149.6; 285/924

(56) References Cited

U.S. PATENT DOCUMENTS 5,730,185 A * 3/1998 Wilkins et al. .......... 137/614.2
5,937,899 A * 8/1999 Zeiber ..................... 137/614
6,588,806 B2 * 7/2003 Arosio ..................... 285/306

* cited by examiner

Primary Examiner—F. Daniel Lopez
Assistant Examiner—John K. Fristoe, Jr.
(74) Attorney, Agent, or Firm—Kirschstein, et al.

(57) ABSTRACT

Quick-action coupling of a flat design, comprising a sleeve-shaped component and a cylinder-shaped component, it being provided that a tube-shaped component, which is provided radially outside the sleeve-shaped component, is connected to the front side of a pipe connecting piece and the opposite end of the pipe connecting piece is connected to an end socket, which is connected to a collector for the hydraulic fluid and, in a chamber which is bounded by the tube-shaped component, there is provided an axially displaceable valve body, which is connected to a pipe body which extends in the longitudinal direction and ends in a tube-shaped component which has at its end openings which are arranged in the circumferential direction and receive arresting balls known per se.

5 Claims, 3 Drawing Sheets

QUICK-ACTION COUPLING OF A FLAT DESIGN

The present invention relates to a quick-action coupling of a flat design.

Quick-action couplings of a flat design substantially comprise a tube-shaped component to which a cylinder-shaped, protruding component can be connected.

These quick-action couplings are today usually of a flat design, i.e. the ends of the coupling parts to be joined together are completely closed off when the coupling parts are not joined together. Quick-action couplings of a flat design are being used increasingly in the area of hydraulics, thanks to their most important property, which is that leakage losses of the hydraulic oil are avoided when the components of the coupling are connected or taken apart.

This advantageous property has made it possible for quick-action couplings also to be used in the area of agricultural machines or construction machines, since in fact there are no ascertainable leakage losses of the hydraulic fluid during the joining together or taking apart of the coupling parts.

It is to be regarded as one disadvantage of the known quick-action couplings that the connecting or disconnecting from each other cannot be carried out if the individual subassemblies for supplying the hydraulic fluid and the devices to be driven of the various items of equipment are under high operating pressure.

In the case of the known quick-action couplings of the first-mentioned type, at the end of the sleeve-shaped piece of pipe there is usually provided a ring-shaped component, which surrounds the piece of pipe.

The ring-shaped component can be manually displaced each time a separation is desired between the components of the quick-action coupling, by actuating the ring-shaped component to achieve the effect that the known arresting balls carry out a radially outwardly directed movement and enter circumferential grooves of the displaceable, ring-shaped component and after that it is possible for the cylinder-shaped component to be disconnected.

The cited manual actuation of the ring-shaped component represents an additional working step, which cannot always be carried out easily and quickly, in particular whenever the quick-action coupling of a flat design is used for example in combination with an agricultural machine or a construction machine.

It can be regarded as a further disadvantage of the aforementioned quick-action couplings which are already available on the market that the part of the coupling of a sleeve-shaped design is connected to the hydraulic collector of the vehicle with flexible pipelines interposed, and these pipelines are provided between the collector and each sleeve-shaped component of the quick-action coupling.

The connecting between the said components using flexible pipelines leads to technical difficulties, however, since these pipelines have proven to be extremely troublesome and have to be fastened to the vehicle in a precisely fixed position; furthermore, it is not possible to rule out the possibility of the connecting lines being damaged, which leads to an undesired escape of the hydraulic fluid.

Under direct tensile loading, there is also the risk of the flexible pipelines tearing or being completely destroyed, with the consequence that the hydraulic fluid escapes from the system of lines.

The object of the present invention is to avoid the disadvantages of the prior art and propose a quick-action connection which makes it possible to disconnect the tube-shaped component and the cylinder-shaped component without entailing the risk of damaging a connecting line and causing the escape of hydraulic fluid.

Furthermore, it is intended for the separation of the components of the quick-action coupling to be possible without manually acting on a displaceable socket, which is equipped with a ring of balls for arresting the joined-together components of the quick-action coupling, and finally it is intended for disconnection of the components of the quick-action coupling or joining together of these components also to be possible under high hydraulic pressure in the pipelines.

The aforementioned objects are achieved by a quick-action coupling of a flat design which comprises a sleeve-shaped component and a cylinder-shaped component, and is characterized in that the radially outer part of the sleeve-shaped component is connected to the front side of a tube-shaped part, and the opposite end of the tube-shaped part is connected to an end socket, which is connected to a collector or a valve body for the hydraulic fluid and, in a chamber bounded by the tube-shaped component, there is provided a valve body which is axially displaceable and has an actuable valve stem, the valve stem being connected to a tube-shaped component which extends in the longitudinal direction and ends in a tube-shaped component which has on its end piece openings which are arranged in the circumferential direction and receive arresting balls in a way known per se.

Further advantages and features of the present invention can be taken from the description which now follows, the subclaims and the accompanying drawings, in which:

Figure 1:
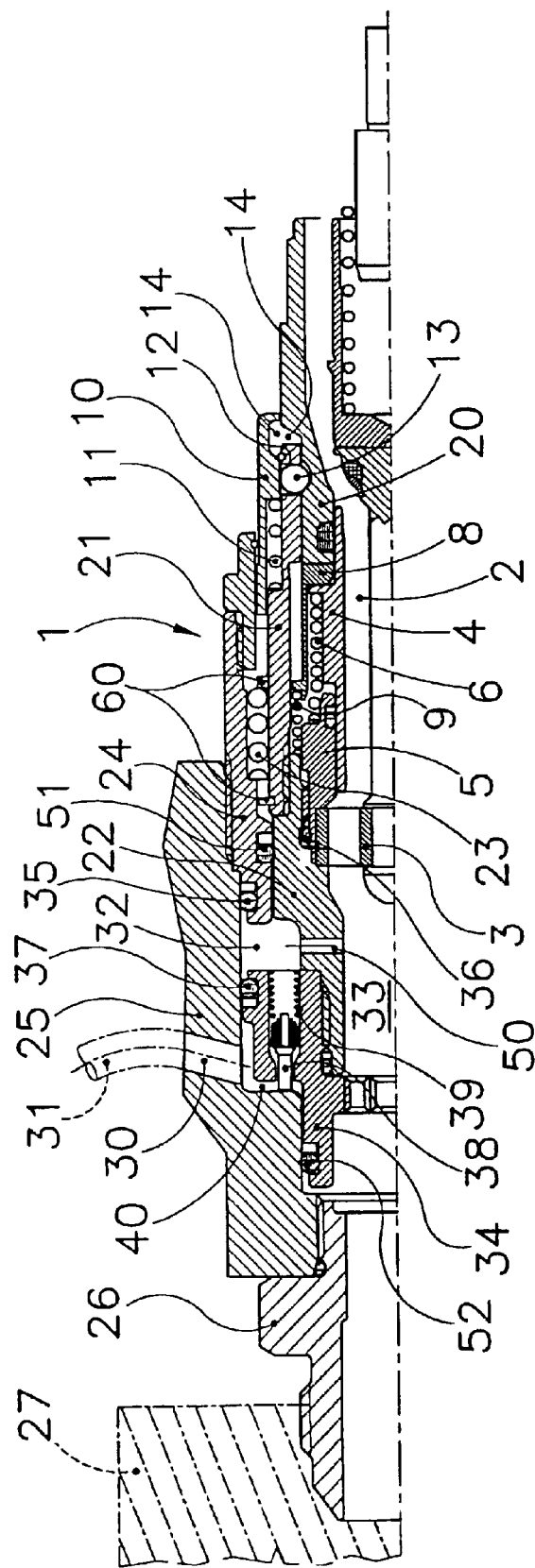
FIG. 1 shows the half of a joined-together quick-action coupling in section.
Figure 2:
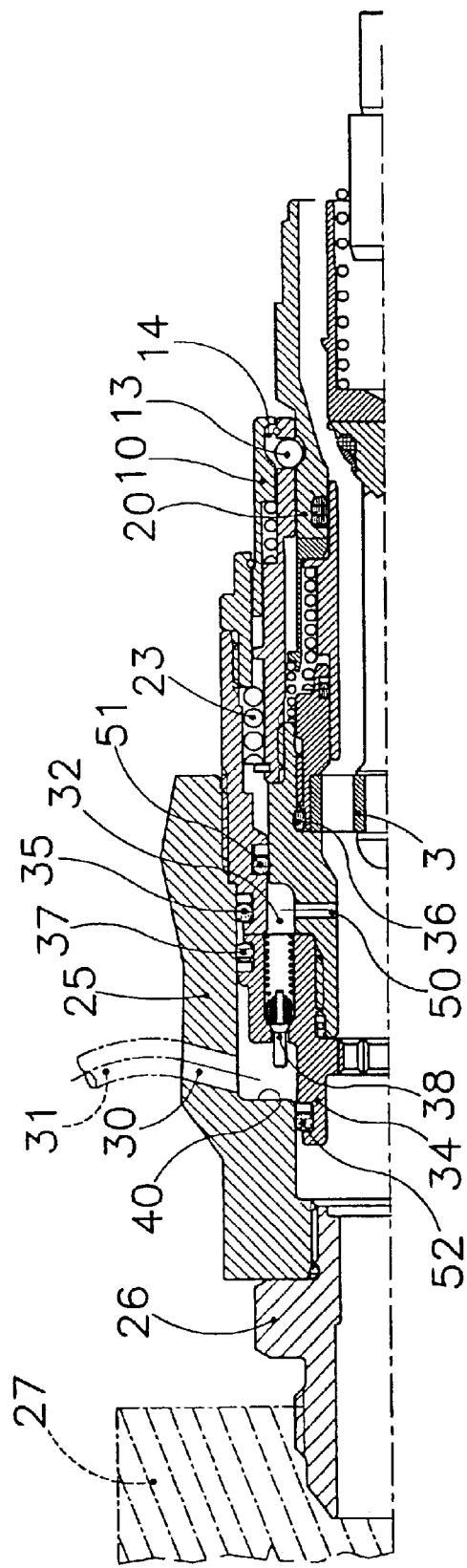
FIG. 2 shows the half of a quick-action coupling during a separating operation in section.
Figure 3:
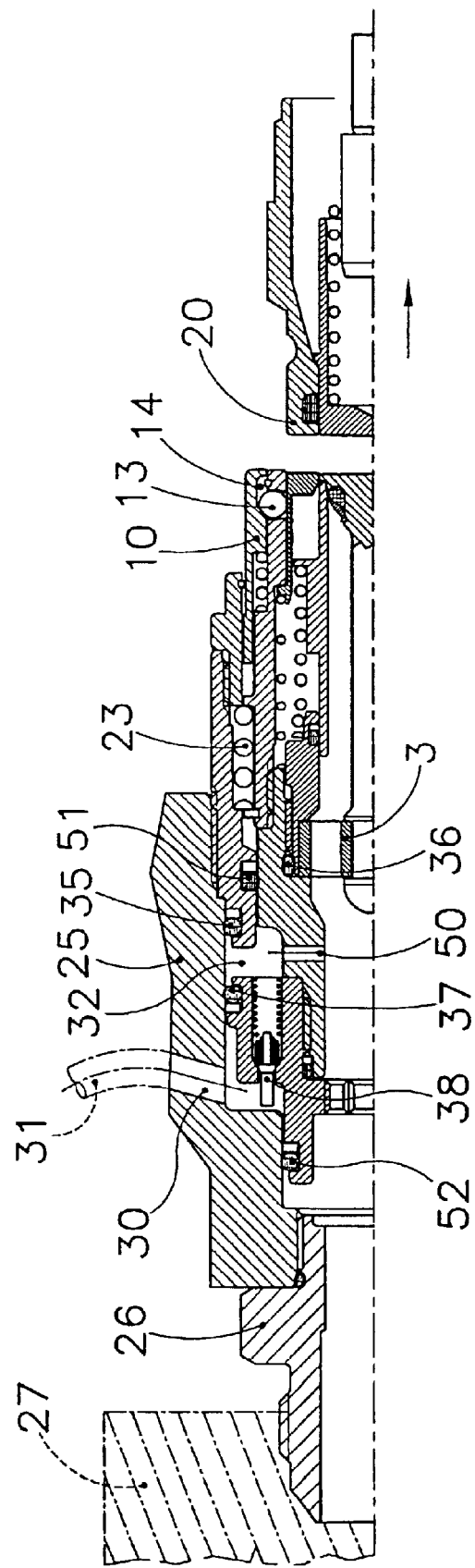
FIG. 3 shows the half of a quick-action coupling after the separating operation has been carried out.

The sleeve-shaped component, which is identified overall by 1, has in the interior a known, rod-shaped formation 2, which is mounted on a ring 3, which is arranged in the channel 33 for the hydraulic fluid to flow through.

Also arranged in the interior of the sleeve-shaped component 1 is a tube-shaped displacing piece 4, which operates with a ring-shaped body 5.

Bearing against the ring-shaped body 5 is a spring 6, which acts on the displacing piece 4, which is operatively connected to an outer, known displacing piece 8, the displacing piece 8 for its part being loaded by a spring 9.

Arranged on the front side of the sleeve-shaped component 1 is a socket or displacing piece 10, which is influenced by a spring 11 and has on the inner side a ring-shaped projection, which acts on known balls 13, which in various positions of the displacing piece 10 can be received by a circumferential groove 14 which has been made in the displacing piece 10.

The cylinder-shaped component has a projection 20 of a tube-shaped design, which is known from the prior art and can be introduced into the sleeve-shaped component 4 and also the inner wall of the tube-shaped component.

The components of the quick-action connection described thus far are known from the prior art.

According to the present invention, the tube-shaped component 21 is joined together with a tube-shaped component 22, which on the radially outer side receives the tube-shaped component 24, which is influenced by a spring 23 which is blocked between stop means 60 protruding radially from the tube-shaped component 21.

All the components described thus far are accommodated in a tube-shaped body 24, which is arranged in an outer, tube-shaped sleeve 25, which serves as a receptacle.

The tube-shaped sleeve 25 is screwed to an end connecting piece 26, which for its part is screwed into a threaded bore which is made in the body 27 of a collector or a group of valves.

Thanks to the provision of a threaded connecting piece 26, there is the possibility of connecting the body 25, and consequently the entire sleeve-shaped component, which is identified overall by 1, directly to the body of the collector 27, without having to provide pipelines for this purpose, it being possible in an advantageous way to dispense with flexible connecting lines, which are troublesome.

The tube-shaped body 25 has an outlet bore 30, which allows the hydraulic fluid to be discharged from the chamber via a small pipe 31.

It is provided that the chamber 32 is in connection with a longitudinal bore 33 of the connection 1 via a bore 50.

The chamber 32 receives a valve body 34, which is connected via a screw connection to the tube-shaped body 22, which serves as a bearing body, and for its part is connected to the tube-shaped body 21.

Between the tube-shaped body 22 and the tube-shaped body 24 there is provided a sealing ring, identified by 35. Between the tube-shaped body 24 and the tube-shaped body 22 there is also provided a sealing ring 36.

Furthermore, it is envisaged that between the valve body 34 and the tube-shaped body 24 there is provided a sealing ring 51 and also between the tube-shaped body 34 and the tube-shaped body 25 there is provided a sealing ring 52.

Furthermore, between the valve body 24 and the body 25 there is provided a further sealing ring.

Thanks to the provision of the sealing rings 37, 51, 52, which bound compartments in which a hydrostatic pressure occurs, a situation of equilibrium is achieved, making it possible for the mechanical components which are arranged in the interior of the tube-shaped component 24 to be axially displaced.

It is particularly the case that the sum of the hydrostatic forces which are fixed by the sealing rings 51 and 52 have the same value as, but are directed in the opposite direction than, the hydrostatic forces which are fixed by the sealing ring 37.

The situation of equilibrium allows easy axial displacement of the entire subassembly, comprising tube-shaped, inner components, independently of the pressure prevailing in the hydraulic circuit.

The valve body 34 also has a valve 38, which is displaced into a blocking position by means of a spring 39.

The valve pin 38 can come to bear against a wall 40, which serves as a stop.

The way in which the quick-action coupling of a flat design according to the present invention operates is as follows:

At the beginning of the joining-together operation, while the sleeve-shaped component is under pressure, the cylinder-shaped component is pushed into the sleeve-shaped component and the thrust of the cylinder-shaped component occurring in the axial direction brings about a return of the displaceable socket 8 until it comes to bear against the tube-shaped socket 4, which is arrested by the internal pressure prevailing in the interior of the sleeve-shaped component.

If the connecting operation is continued, the entire inner component moves further back and stresses the spring 23.

At the same time, the valve 38 comes into contact with the wall 40 of the sleeve 25 and consequently opens the valve 38 against the action of the spring 39. Opening of the valve consequently makes it possible for part of the hydraulic fluid of the circuit to escape via the bore 30 and flow away via the small pipe 31, which leads to a reduction in the internal pressure.

The escaping hydraulic fluid is returned to the main tank of the hydraulic system of the machine via the small pipe 31.

The reduction in the pressure inside the sleeve-shaped component of the quick-action coupling leads to an unlocking of the socket 4 of a tube-shaped design and consequently makes it possible for the cylinder-shaped component to be introduced into the interior of the sleeve-shaped component until the groove which is provided at the front end of the protruding part of the cylinder-shaped component allows the balls 13 to run into the groove 12, thereby making it possible for the cylinder-shaped component to be completely inserted.

What is claimed is:

1. A hydraulic coupling arrangement, comprising:
a pair of coupling components having flat faces bearing against each other during coupling, one of the components extending along a longitudinal axis and having a flow channel through which a pressurized fluid flows to the other of the components during coupling, said one component including:
   a) an outer, tubular sleeve having a discharge passage,
   b) an end piece at an axial end region of the sleeve and connected to a supply of the pressurized fluid,
   c) a displaceable member axially bearing against the other component during coupling,
   d) a first movable member axially movable by the displaceable member during coupling,
   e) a valve body connected to the first movable member for joint movement therewith,
   f) a bypass passage extending through the first movable member between the flow channel and the discharge passage,
   g) a radially offset valve mounted in the valve body within the bypass passage for movement along an offset axis parallel to the longitudinal axis between a closed position in which the valve blocks the flow of the fluid to the discharge passage, and an open position in which the valve enables the fluid to flow to the discharge passage during coupling, and
   h) a spring located remotely from the flow channel between the displaceable member and the first movable member, for restoring the displaceable member to its initial position upon uncoupling of the components, and for axially urging the valve body away from the displaceable member toward the outer sleeve.

2. The arrangement of claim 1, and a pair of fluid seals between the valve body and the outer sleeve at opposite sides of the valve.

3. The arrangement of claim 1, wherein the valve has a pin extending along the offset axis and abutting a wall of the sleeve to move the valve to the open position during coupling.

4. The arrangement of claim 3, wherein the wall is perpendicular to the longitudinal axis.

5. The arrangement of claim 1, and a return spring for constantly biasing the valve to the closed position.

* * * * *